United States Patent [19]
DiCicca et al.

[11] Patent Number: 4,581,241
[45] Date of Patent: Apr. 8, 1986

[54] PROCESS FOR PRODUCING AN ENHANCED CITRUS FLAVOR

[75] Inventors: Frank DiCicca, Middletown; Joseph J. Cipriano, Cranbury, both of N.J.

[73] Assignee: General Foods Corporation, White Plains, N.Y.

[21] Appl. No.: 744,888

[22] Filed: Jun. 17, 1985

Related U.S. Application Data

[63] Continuation of Ser. No. 605,449, Apr. 30, 1984, abandoned.

[51] Int. Cl.⁴ .............................................. A23L 1/212
[52] U.S. Cl. ...................................... 426/616; 426/49
[58] Field of Search .................................. 426/616, 49

[56] References Cited

U.S. PATENT DOCUMENTS

| | | | |
|---|---|---|---|
| 1,813,366 | 7/1931 | Teusch | 426/49 |
| 2,596,662 | 5/1952 | Dueker | 426/616 |
| 3,112,202 | 11/1963 | Wadsworth | 426/616 |
| 4,232,053 | 11/1980 | Blake | 426/616 |
| 4,267,196 | 5/1981 | Johnston | 426/49 |
| 4,275,648 | 6/1981 | Mouri et al. | 426/51 X |

*Primary Examiner*—Joseph Golian
*Attorney, Agent, or Firm*—Linn I. Grim; Thomas R. Savoie; Daniel J. Donovan

[57] ABSTRACT

A process is provided for preparing an improved natural citrus fruit flavor from citrus rinds.

22 Claims, No Drawings

PROCESS FOR PRODUCING AN ENHANCED CITRUS FLAVOR

This application is a continuation of application Ser. No. 605,449, filed Apr. 30, 1984 and now abandoned.

BACKGROUND OF THE INVENTION

1. Field of the Invention

This invention relates to a process for preparing an improved natural citrus flavor and more particularly to a process for preparing a natural citrus flavor product having superior flavor qualities with increased strength and a reduced bitter taste sensation from the combination of comminuted citrus rinds and an aqueous carbohydrate solution.

2. Description of the Prior Art

It is well-known that the rind of citrus fruits is nutritionally excellent because it contains great quantities of various vitamins such as vitamin A and vitamin C. In general, the rinds of citrus fruits are thrown away because the rind has a bitter taste which debases the quality of the resulting juices.

Many attempts have been made heretofore to utilize the rind and other wastes of the citrus food. U.S. Pat. No. 1,813,366 to Teusch, issued July 7, 1931 describes the physical removal of the bitter taste from the orange rinds by soaking the rinds in water for several days or in a citrus juice for a few hours, after which the water or orange juice is removed, recovering the debittered rinds for further use such as in confectionery, jam, extracts for beverages or the like. Additionally, U.S. Pat. No. 2,596,662 to Ducker et al., issued May 13, 1952 also describes a process for preparing an edible product constituting the rinds of citrus fruit by physically removing the bitter taste from the rind. This is accomplished by comminuting the rinds to small particles, placing these particles in water, heating at high temperatures between 230° F. to 250° F. for a period of time, then the rind is recovered from the water containing the bitter ingredients and the water is discarded. The rind is then used in confectionary or other foods. U.S. Pat. No. 4,275,648 to Mouri et al., issued June 30, 1981 describes a method for producing fruit juices, free of unpleasant odor and taste, by boiling the whole fruit, including the rind, squeeze residues and the like at temperatures of at least 90° C. for 3 to 20 minutes. The texture of the fruit is destroyed by a chopper and the pH is controlled with an organic acid. An enzyme such as cellulose, hemicellulase, amylase, pectinase, or a mixture thereof, is added for decomposing the plant tissue of the crushed material at 40° C. An additional comminuting step is carried out of the crushed material before or during the enzyme treatment. The enzyme is deactivated by heating to 100° C. for less than 5 minutes, followed by filtering the product and concentrating the filtered product. This process requires at least 2 comminuting steps, use of additional enzymes and the addition of organic acids to control the reaction medium. U.S. Pat. No. 4,267,196 to Johnston, issued May 12, 1981 describes a process for preparing a palatable and edible food product for human consumption from a fruit precursor comprising substantially non-edible and substantially non-palatable portions of the fruit such as citrus fruit peels, pith and the like by comminuting the fruit precursor, in the presence of a diluting agent such as water, sugar solutions, dilute syrup, fruit processing slurries etc. The comminuted precursor is digested in the presence of a digesting agent such as sodium bicarbonate, sodium carbonate, potassium carbonate and the like to adjust the pH of the precursor to 7 to 8.2 to permit the amylytic enzymes in these fruits to work at temperatures below 45° C. After the digestion step, neutralization agents which can be the same as the digesting agents, can be added to provide the same pH as the comminuted precursor prior to digestion. The resulting product can be packaged for distribution to the food industry or can be incorporated into other food products such as fruit juice, desserts and the like. Another U.S. Pat. No. 4,232,053 to Blake, issued Nov. 4, 1980 describes the preparation of a comestible base from major amounts of residual citrus juice vesicles, a nutritive carbohydrate sweetening agent, a non-volatile organic acid, ungelatinized starch and water cooked at temperature between 180° F. and 280° F. This process uses specific portions of the citrus fruits, e.g., the juice vesicles, but does not use the rinds to effect the desired result.

In the present invention, a process has been discovered for preparing an improved natural citrus fruit flavor product containing comminuted citrus rinds, having superior flavor qualities with increased strength and reduced bitter taste without physically removing the bitter taste ingredients, without the addition of enzymes to the process and without the addition of digesting and/or neutralizing agents.

SUMMARY OF THE INVENTION

The present invention relates to a process for preparing an improved natural citrus fruit flavor from citrus rinds. The resulting product has superior flavor qualities with increased strength and a reduced bitter taste sensation using the following procedure: comminuting citrus rinds, combining the comminuted citrus rinds with an aqueous carbohydrate solution; digesting the resulting combination at temperatures from about 90° F. (32° C.) to about 110° F. (43° C.) for a period of time to debitter the citrus rinds and then heating the digested combination at temperatures from about 212° F. (100° C.) to about 270° F. (132° C.) for a period of time to obtain a product having a flavor strength enhancement, improved full bodied flavor system along with a candied marmalade citrus character, and a reduced bitter taste sensation. It is preferred to comminute the citrus rinds in the presence of an aqueous carbohydrate solution to form a puree. This product can be used to enhance the flavor of naturally occurring citrus juices, ready-to-drink beverages, and can be dehydrated for addition to dry beverage mixes. Further uses of the product of this invention can be in its addition to confectionary, desserts and the like to enhance the flavor of the citrus fruit.

DETAILED DESCRIPTION OF THE INVENTION

According to this invention, the flavedo or rind of a citrus fruit is comminuted in any kind of mixer or grinder known to the art to particle sizes below about 1000 microns and preferably below about 100 microns. The citrus fruit rind can include any type of citrus fruit peel such as lime, lemon, orange, tangerine, mandarin, grapefruit and the like. The rind which is used, can be peeled from the citrus fruit in a way to eliminate the albedo of the fruit or it can contain part or all of the albedo of the fruit. It is preferred to include about 5 to about 20% by weight albedo along with the flavedo or rind. The whole fruit can be comminuted if desired, however, if the whole fruit is used, the rag and the seed of the fruit should be removed prior to the addition of the aqueous carbohydrate since all of the ingredients present at the start of the process are present in the final product with the exception of the water if the final product is dehydrated.

The citrus rinds can be comminuted separately and the aqeuous carbohydrate solution can be added thereto or the citrus rinds can be comminuted in the presence of the aqueous carbohydrate solution to form a puree. The aqueous carbohydrate solution suitable for use is preferably the natural juices of the fruit rinds being processed. These natural fruit juices can include orange, lemon, lime, grapefruit, tangerine, mandarin, and the like. In addition to the natural fruit juices, aqueous solutions of monosaccharide or disaccharide sugars such as sucrose, invert sugar dextrose, lactose, honey, maltose, fructose, maple syrup, high fructose corn syrup and the like, can be used. Mixtures of the natural juices and sugars can be utilized, if desired. The percent carbohydrate in the aqueous solution varies from about 5 to about 80 weight percent of the solution, preferably 8 to about 25 weight percent and more preferably from about 10 to about 12 weight percent which essentially correlates to the amount of carbohydrate in natural juices. The amount of water present in the puree ranges from about 0.5 to about 3 times, preferably about 0.5 to about 2 times the amount of rind present in the puree.

The puree, a combination of the comminuted citrus rinds and the aqueous carbohydrates, is then digested or incubated at temperatures from about 90° F. to about 110° F., preferably at temperatures from about 95° F. to about 105° F. for a period of time to debitter the citrus rinds. The time for digestion or incubation can range from about 0.5 hours to about 6 hours, preferably about 3 to about 5 hours. The resulting product has a significantly reduced bitter taste.

After the incubation or digestion of the puree, the temperatures are increased to about 212° F. to about 270° F. or higher, preferably about 212° F. to about 248° F. in a closed reactor for a short period of time for example about 2 to about 30 minutes, preferably about 5 to about 15 minutes, to develop the desired flavor and enhanced flavor strength of the citrus taste and to further debitter.

In order to determine that sufficient enhancement has occurred, one can do this by organoleptic determination, that is tasting the puree before and after treatment in determining that increase in flavor has occurred. For example, if a five fold increase has occurred, the concentrated puree may be diluted by 1/5 and then compared to the original flavor to determine that its concentrated strength when diluted by a factor of 5 is equivalent to the original flavor.

This concentrated puree may be used as is to enhance the flavor of various product systems or may be sprayed-dried onto a carrier such as dextrose to be used in products such as powdered fruit drinks.

This debittered flavor enhanced concentrate may be added back to fruit juices to enhance the flavor of the fruit juice. In some cases, in order to extend the yield of a fruit juice system other components may be added from the juice such as the albedo to extend the yield of the fruit juice. This, however, causes a reduction in flavor which may be enhanced by the addition of the concentrate. Furthermore, a flavor from one fruit system such as an orange flavor may be used to add that flavor note to a juice of another citrus fruit as for example grapefruit. Additionally in this invention, artificially fruit flavored fruit beverages may be flavored with the natural flavorant of this invention such as, for example, powdered fruit drinks or ready-to-drink beverages.

The following examples are presented to illustrate the invention but is to be understood that the invention is not to be limited to the embodiments described herein.

EXAMPLE 1

A natural orange flavor thermally enhanced was produced in the following manner: One hundred pounds of Florida Valencia oranges were washed, peeled and processed producing 13 pounds of flavedo or rinds, 68 pounds of natural orange juice (pits removed) and 19 pounds albedo and rag. The rinds (13 pounds) and orange juice (68 pounds) were blended in a Commitrol Unit and comminuted to particles sizes below 100 microns. The resulting product was incubated or digested for 4 hours at 100° F. The resulting product, on tasting, indicated a significant decrease of bitterness compared to the original comminuted blend prior to the heating step. After the incubation or digestion has been completed, the product was heated at 239° F. for 10 minutes in a closed reactor under autogenous pressure forming a puree with enhanced flavor, increased flavor strength and further decreased bitterness when compared to the comminuted blend after the incubation or digestion step and prior to final heating step. This product can be added to a ready-to-drink orange beverage to enhance its flavor and increase its flavor strength. The puree of this example can be mixed with gum arabic and other ingredients and spray dried to obtain a dried product for addition in a dry mixed beverage in the following procedures:

A mixture was produced containing the following: 100 grams puree produced above; 40 grams of a fixative matrix containing 85% malto-dextrin having 5 dextrose equivalents (FRODEX 5) and 15% gum arabic and 120 grams water. Using a standard spray drying technique, a solid product was obtained from the above mixture. The resulting solid product when added to an orange flavored dry mixed beverage provides, on reconstitution, a drink having a fuller, rounded, orange-base character and an increased perceived mouthfeel effect.

In a similar manner as above, a combination of 93.75 grams of the puree above, 6.25 grams natural orange enhancer, 40 grams of a fixative matrix containing 85% malto-dextrin having 5 dextrose equivalents (Frodex 5) and 15% gum arabic and 120 grams water, was prepared. This combination was spray dried and combined with a dry-mix, orange-flavored beverage to provide not only a full, rounded, orange-base character and an acceptable perceived mouthfeel effect but also a desirable aromatic top note enhancement effect or top note developments. In a similar manner as above, 10 grams of a natural orange flavor with 90 grams of puree can be mixed with same amount of water and same Frodex 5 gum arabic as above to achieve the same desired results.

EXAMPLE II

A natural lemon flavor, thermally enhanced, was produced in the following manner: 2.9 kilograms lemon peel, 3.86 kilograms natural lemon juice, without pulp and 2.04 kilograms aqueous high fructose corn syrup (55% solids), were blended in a fruit processor until the particle sizes of the solids were below 100 microns. The resulting product was incubated or digested for 3 hours at 100° F. (relative humidity 25-35%). The resulting product, on tasting, indicated a significant decrease of bitterness. This product (8.48 kilograms) was heated at 239° F. for 15 minutes in a closed reactor under autogenous pressure forming a puree (8.2 kilograms) with an improved lemon flavor character and an increased flavor strength over the original starting blend. For every 100 grams of product returned from the last heating step, 44 grams of water was added forming a puree having the enhanced lemon flavor and increased flavor strength. 100 grams of puree, 40 grams of a fixative matrix containing 85% malto-dextrin having 5 dextrose equivalents (Frodex 5) and 15% gum arabic and 17.15 grams of water were spray dried to produce a solid lemon flavor enhancer suitable for the addition to a dry mixed beverage.

What is claimed is:

1. A process for preparing an improved natural citrus fruit flavor having superior flavor qualities with increased strength and reduced bitter taste sensation which comprises:
   (a) comminuting citrus rinds to a particle size below about 1,000 microns;
   (b) combining said comminuted citrus rinds with an aqueous carbohydrate containing solution containing about 5% to about 80% by weight carbohydrate; said solution being present in amounts sufficient to form a puree; said carbohydrate selected from the group consisting of the carbohydrates contained in natural citrus fruit juices, monosaccharide sugars and disaccharide sugars;
   (c) digesting said combination of comminuted citrus rinds and aqueous carbohydrate solution without added enzymes to a temperature from about 90° F. to about 110° F. for a period of time from about 3 to about 6 hours to reduce the bitterness of said citrus rind;
   (d) heating said digested combination of comminuted citrus rinds and aqueous carbohydrate solution at temperatures from about 212° F. to about 270° F. in a closed reactor for a period of time from about 2 to about 30 minutes to obtain a product having greater flavor strength enhancement, a reduced bitter taste sensation and development of desirable flavor characteristics.

2. The process of claim 1 wherein the citrus rinds are comminuted in the presence of an aqueous carbohydrate solution.

3. The process of claim 1 wherein about 5 to about 20% by weight of the albedo is present with the citrus rind.

4. The process of claim 1 wherein the rind is obtained from a fruit selected from the group consisting of oranges, lemons, tangerines, mandarins, grapefruits and limes.

5. The process of claim 2 wherein the rind is obtained from a fruit selected from the group consisting of oranges, lemons, tangerines, mandarins, grapefruits and limes.

6. The process of claim 2 wherein the rind is obtained from a fruit selected from the group consisting of oranges, lemons, tangerines, mandarins, grapefruits and limes.

7. The process of claim 1 wherein the natural citrus rinds are obtained from oranges.

8. The process of claim 2 wherein the natural citrus rinds are obtained from oranges.

9. The process of claim 3 wherein the natural citrus rinds are obtained from oranges.

10. The process of claim 1 wherein the natural citrus rinds are obtained from lemons.

11. The process of claim 2 wherein the natural citrus rinds are obtained from lemons.

12. The process of claim 3 wherein the natural citrus rinds are obtained from lemons.

13. The process of claim 8 wherein the digestion takes place at temperatures from about 95° F. to about 105° F. for a period of time from about 3 to about 5 hours.

14. The process of claim 9 wherein the digestion takes place at temperatures from about 95° F. to about 105° F. for a period of time from about 3 to about 5 hours.

15. The process of claim 11 wherein the digestion takes place at temperatures from about 95° F. to about 105° F. for a period of time from about 3 to about 5 hours.

16. The process of claim 12 wherein the digestion takes place at temperatures from about 95° F. to about 105° F. for a period of time from about 3 to about 5 hours.

17. The process of claim 13 wherein the heating of said digested combination of orange rinds and an aqueous carbohydrate solution is about 212° F. to about 248° F. for about 2 minutes to about 30 minutes in a closed reactor.

18. The process of claim 14 wherein the heating of said digested combination of orange rinds and an aqueous carbohydrate solution is about 212° F. to about 248° F. for about 2 minutes to about 30 minutes in a closed reactor.

19. The process of claim 17 wherein the aqueous carbohydrate solution is selected from the group consisting of orange juice, lemon juice, grapefruit juice, lime juice, tangerine juice and mandarin juice.

20. The process of claim 17 wherein the aqueous carbohydrate solution is selected from the group consisting of orange juice, lemon juice, grapefruit juice, lime juice, tangerine juice and mandarin juice.

21. The process of claim 19 wherein the aqueous carbohydrate solution is orange juice.

22. The process of claim 20 wherein the aqueous carbohydrate solution is orange juice.

* * * * *